(12) United States Patent
Otaki et al.

(10) Patent No.: US 7,044,262 B2
(45) Date of Patent: May 16, 2006

(54) POWER STEERING SYSTEM

(75) Inventors: Mizuo Otaki, Kanagawa (JP);
Masakazu Kurata, Yokohama (JP)

(73) Assignee: Hitachi, Ltd., Tokyo-to (JP)

( * ) Notice: Subject to any disclaimer, the term of this patent is extended or adjusted under 35 U.S.C. 154(b) by 45 days.

(21) Appl. No.: 10/796,141

(22) Filed: Mar. 10, 2004

(65) Prior Publication Data
US 2004/0195037 A1 Oct. 7, 2004

(30) Foreign Application Priority Data
Apr. 4, 2003 (JP) .............................. 2003-101045

(51) Int. Cl.
*B62D 5/08* (2006.01)
(52) U.S. Cl. ...................... 180/422; 180/442
(58) Field of Classification Search ................ 180/421, 180/422, 441, 442; 91/575 A, 444, 448
See application file for complete search history.

(56) References Cited

U.S. PATENT DOCUMENTS 6,193,009 B1 * 2/2001 Chino et al. ................ 180/441
6,298,941 B1 * 10/2001 Spadafora .................... 180/422
6,568,499 B1 * 5/2003 Nakazawa et al. .......... 180/422
6,880,668 B1 * 4/2005 Sakaki et al. ................ 180/441
6,886,657 B1 * 5/2005 Yokota et al. ............... 180/422

FOREIGN PATENT DOCUMENTS

JP 2002-145087 A 5/2002

* cited by examiner

*Primary Examiner*—Lesley D. Morris
*Assistant Examiner*—L. Lum
(74) *Attorney, Agent, or Firm*—Foley & Lardner LLP

(57) ABSTRACT

A power steering system and a method of charging the power steering system with hydraulic fluid are provided. Hydraulic fluid is selectively supplied to hydraulic chambers of a power cylinder via oil passages from a reversible pump, according to a steering torque. In addition, a bypass passage is provided between oil passages. A normally open switching valve is provided in the bypass passage. When the system is assembled, the hydraulic fluid is supplied from an oil reservoir via the switching valve or the reversible pump, and circulated in the hydraulic circuit. The air in the hydraulic circuit is discharged via the switching valve.

8 Claims, 4 Drawing Sheets

POWER STEERING SYSTEM

BACKGROUND OF THE INVENTION

The present invention relates generally to power steering systems of vehicles, and more particularly to a power steering system of an automotive vehicle that operates a power cylinder according to a steering torque output from a steering wheel for boosting the steering torque.

Recent years, there have been disclosed various power steering systems. One such system is disclosed in Japanese Patent Provisional Publication No. 2002-145087 published May 22, 2002 and assigned to the assignee of the present invention. The power steering system of this publication includes a steering shaft connected to a steering wheel, an output shaft connected to the lower end of the steering shaft, a pinion provided at the lower end of the output shaft, a rack engaged with the pinion, a power cylinder associated with the rack, a reversible oil pump for selectively supplying hydraulic fluid to the first hydraulic chamber at the left-side and the second hydraulic chamber at the right-side of the power cylinder via a first passage and a second passage, a bypass passage provided between the first passage and the second passage, and an electromagnetic valve provided in the bypass passage for opening and closing the bypass passage.

When the steering wheel is turned on driving, a detecting mechanism detects a steering torque. The detecting mechanism outputs a signal of closure to the electromagnetic valve via a control circuit, while the reversible oil pump is rotated normally or reversely. In this way, hydraulic fluid is selectively supplied to one hydraulic chamber and passage from the other hydraulic chamber and passage.

Furthermore, the power steering system includes a failure monitoring circuit. When a failure is detected in the power steering system by the failure monitoring circuit, the electromagnetic valve is opened to provide a fail-safe operation.

SUMMARY OF THE INVENTION

In the aforementioned power steering system, the hydraulic circuit, which selectively supplies hydraulic fluid to or drains it from each hydraulic chamber of the power cylinder, is composed of a closed circuit. Accordingly, when the hydraulic circuit is charged with hydraulic fluid at the first step, the hydraulic fluid is evacuated from an oil reservoir into the hydraulic circuit by a vacuum pump via a check valve provided between the reversible oil pump and the oil reservoir. When the air such as air bubbles is trapped in the hydraulic circuit, the evacuation from the oil reservoir is operated again to eliminate the trapped air.

However, the hydraulic circuit is composed of a closed circuit. Accordingly, the evacuation is operated only via a clearance of the reversible pump, to lead to a long time for the charging operation. In addition, an incomplete operation of charging is frequently caused, to need repeated operations of evacuation. As a result, the difficulty of elimination of air leads to lowering the efficiency of charging the hydraulic circuit with hydraulic fluid and to a high cost of the operation.

Accordingly, it is an object of the present invention to provide a power steering system that is efficiently charged with hydraulic fluid.

In order to accomplish the aforementioned and other objects of the present invention, a power steering system comprises a steering shaft operatively associated with a steering mechanism, a power cylinder having a pair of hydraulic chambers for boosting a steering torque of the steering mechanism, a first oil passage hydraulically connected to one of the hydraulic chambers of the power cylinder, a second oil passage hydraulically connected to another of the hydraulic chambers of the power cylinder, a reversible pump having an oil outlet hydraulically connected to the first oil passage and another oil outlet hydraulically connected to the second oil passage, a drive unit that drives the reversible pump, a control unit that outputs a drive signal to the drive unit, based on a steered state of the steering shaft, a bypass passage that hydraulically connects the first oil passage to the second oil passage, a switching valve provided in the bypass passage, for switching between an open state and a closed state of the bypass passage, an oil reservoir that stores hydraulic fluid, and a first communicating passage that communicates the bypass passage and the oil reservoir via the switching valve to each other.

According to another aspect of the invention, a power steering system comprises a steering shaft operatively associated with a steering mechanism, a power cylinder having a pair of hydraulic chambers for boosting a steering torque of the steering mechanism, a first oil passage hydraulically connected to one of the hydraulic chambers of the power cylinder, a second oil passage hydraulically connected to another of the hydraulic chambers of the power cylinder, a reversible pump having an oil outlet hydraulically connected to the first oil passage and another oil outlet hydraulically connected to the second oil passage, a drive unit that drives the reversible pump, a control unit that outputs a drive signal to the drive unit, based on a steered state of the steering shaft, a bypass passage that hydraulically connects the first oil passage to the second oil passage, a switching valve provided in the bypass passage, for switching between an open state and a closed state of the bypass passage, an oil reservoir that stores hydraulic fluid, a first communicating passage that communicates the bypass passage and the oil reservoir via the switching valve to each other, and a second communicating passage that communicates the reversible pump and the oil reservoir to each other.

According to a further aspect of the invention, a power steering system comprises a steering mechanism having an input portion adapted to steering operation and an output portion adapted to be operatively associated with a wheel, for transferring a steering torque from the input portion to the output portion, a power cylinder operatively associated with the steering mechanism and having a first hydraulic chamber and a second hydraulic chamber, for boosting the steering torque according to a hydraulic pressure difference between the first hydraulic chamber and the second hydraulic chamber, a reversible pump unit having a first oil outlet and a second oil outlet, for supplying pressurized hydraulic fluid via either of the first oil outlet and the second oil outlet, a first oil passage having one end hydraulically connected to the first hydraulic chamber of the power cylinder and one end hydraulically connected to the first oil outlet of the reversible pump unit, a second oil passage having one end hydraulically connected to the second hydraulic chamber of the power cylinder and one end hydraulically connected to the second oil outlet of the reversible pump unit, a bypass passage having one end hydraulically connected to the first oil passage and one end hydraulically connected to the second oil passage, a switching valve provided at a midpoint of the bypass passage, for switching between an open state and a closed state of the bypass passage, an oil reservoir hydraulically connected to the bypass passage via the switching valve, and a control unit, for controlling an operation of the reversible pump unit and an operation of the switching valve.

According to a still further aspect of the invention, a power steering system comprises steering means for transferring a steering torque, a power cylinder operatively associated with the steering mechanism and having a first hydraulic chamber and a second hydraulic chamber, for boosting the steering torque according to a hydraulic pressure difference between the first hydraulic chamber and the second hydraulic chamber, reversible pumping means for supplying pressurized hydraulic fluid, first connecting means for hydraulically connecting the first hydraulic chamber of the power cylinder to the reversible pumping means, second connecting means for hydraulically connecting the second hydraulic chamber of the power cylinder to the reversible pumping means, bypass means for hydraulically connecting the first oil passage to the second oil passage, switching means for switching between an open state and a closed state of the bypass means, oil reserving means for storing hydraulic fluid, communicating means for hydraulically connecting the bypass means to the oil reserving means via the switching means, and control means for controlling an operation of the reversible pumping means and an operation of the switching means.

According to another aspect of the invention, a method of charging a power steering system with hydraulic fluid, the power steering system including a steering shaft operatively associated with a steering mechanism, a power cylinder having a pair of hydraulic chambers for boosting a steering torque of the steering mechanism, a first oil passage hydraulically connected to one of the hydraulic chambers of the power cylinder, a second oil passage hydraulically connected to another of the hydraulic chambers of the power cylinder, a reversible pump having an oil outlet hydraulically connected to the first oil passage and another oil outlet hydraulically connected to the second oil passage, a drive unit that drives the reversible pump, a control unit that outputs a drive signal to the drive unit, based on a steered state of the steering shaft, a bypass passage that hydraulically connects the first oil passage to the second oil passage, a switching valve provided in the bypass passage, for switching between an open state and a closed state of the bypass passage, an oil reservoir that stores hydraulic fluid, and a first communicating passage that communicates the switching valve and the oil reservoir to each other, the method comprises a first operation of opening the switching valve, a second operation of evacuating air in the power steering system via the first communicating passage, and a third operation of charging the power steering system with hydraulic fluid via the first communicating passage.

According to another aspect of the invention, a method of charging a power steering system with hydraulic fluid, the power steering system including a steering shaft operatively associated with a steering mechanism, a power cylinder having a pair of hydraulic chambers for boosting a steering torque of the steering mechanism, a first oil passage hydraulically connected to one of the hydraulic chambers of the power cylinder, a second oil passage hydraulically connected to another of the hydraulic chambers of the power cylinder, a reversible pump having an oil outlet hydraulically connected to the first oil passage and another oil outlet hydraulically connected to the second oil passage, a drive unit that drives the reversible pump, a control unit that outputs a drive signal to the drive unit, based on a steered state of the steering shaft, a bypass passage that hydraulically connects the first oil passage to the second oil passage, a switching valve provided in the bypass passage, for switching between an open state and a closed state of the bypass passage, an oil reservoir that stores hydraulic fluid, a first communicating passage that communicates the bypass passage and the oil reservoir via the switching valve to each other, and a second communicating passage that communicates the reversible pump and the oil reservoir to each other, the method comprises a first operation of opening the switching valve, and a second operation of charging the power steering system with hydraulic fluid via the second communicating passage.

According to another aspect of the invention, a method of controlling an operation of a power steering system including a steering mechanism having an input portion adapted to steering operation and an output portion adapted to be operatively associated with a wheel, for transferring a steering torque from the input portion to the output portion, a power cylinder operatively associated with the steering mechanism and having a first hydraulic chamber and a second hydraulic chamber, for boosting the steering torque according to a hydraulic pressure difference between the first hydraulic chamber and the second hydraulic chamber, a reversible pump unit having a first oil outlet and a second oil outlet, for supplying pressurized hydraulic fluid via either of the first oil outlet and the second oil outlet, a first oil passage having one end hydraulically connected to the first hydraulic chamber of the power cylinder and one end hydraulically connected to the first oil outlet of the reversible pump unit, a second oil passage having one end hydraulically connected to the second hydraulic chamber of the power cylinder and one end hydraulically connected to the second oil outlet of the reversible pump unit, a bypass passage having one end hydraulically connected to the first oil passage and one end hydraulically connected to the second oil passage, a switching valve provided at a midpoint of the bypass passage, for switching between an open state and a closed state of the bypass passage, an oil reservoir hydraulically connected to the bypass passage via the switching valve, and a control unit, for controlling an operation of the reversible pump unit and an operation of the switching valve, the method comprising, detecting an initial steering torque, determining whether the initial steering torque is greater than or equals to a first predetermined value, closing the switching valve and energizing the reversible pump unit, when the initial steering torque is greater than or equals to the first predetermined value, determining whether the reversible pump unit is operative or inoperative, after energizing the reversible pump unit, opening the switching valve and de-energizing the reversible pump unit, when the reversible pump unit is inoperative, detecting a current steering torque, when the reversible pump unit is operative, determining whether the current steering torque is less than or equals to a second predetermined value, and opening the switching valve, when the current steering torque is less than or equals to the second predetermined value.

The above objects and other objects, features, and advantages of the present invention are readily apparent from the following detailed description of the best modes for carrying out the invention when taken in connection with the accompanying drawings.

DETAILED DESCRIPTION OF THE INVENTION

Figure 1:
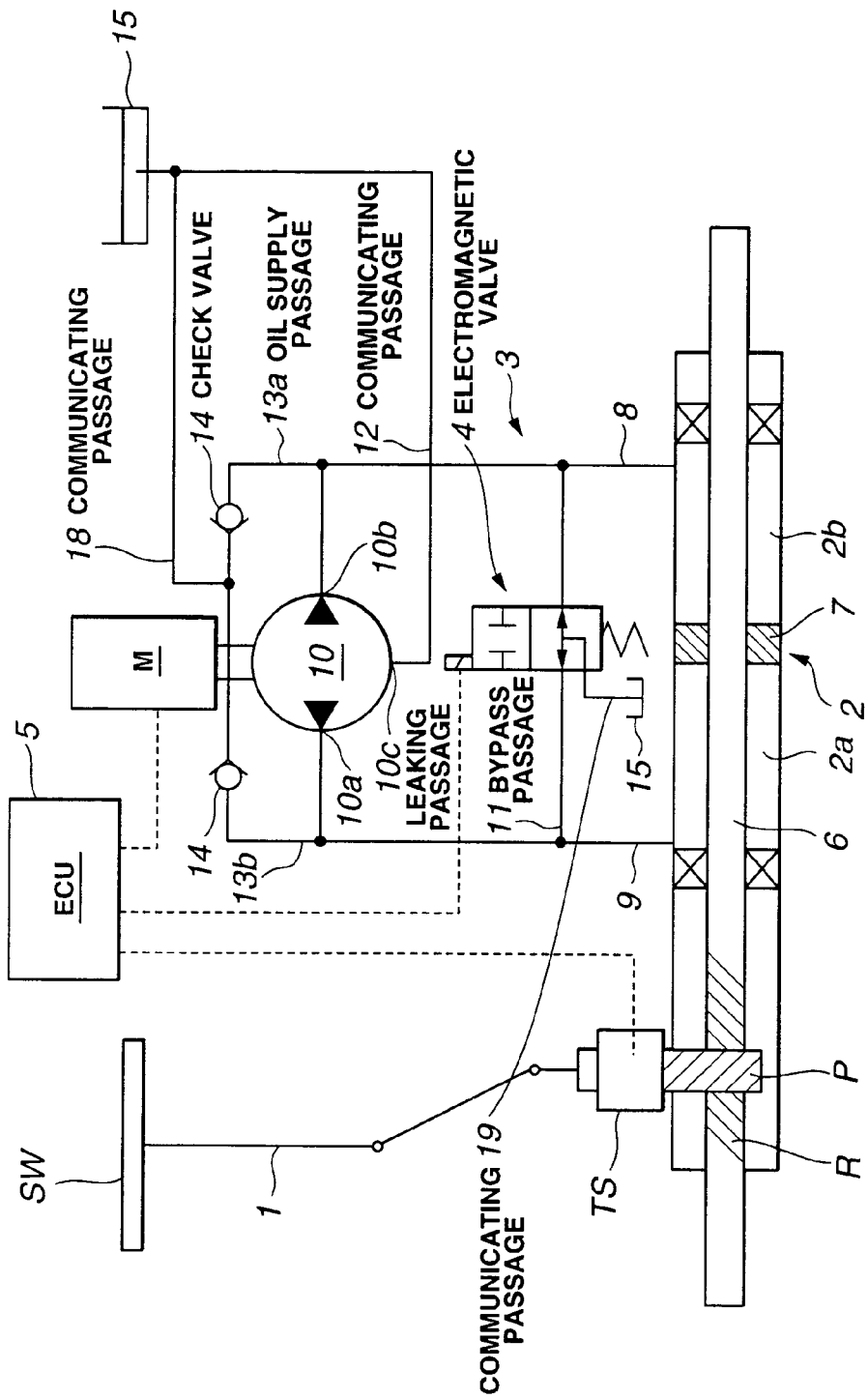
FIG. 1 is a schematic diagram depicting a power steering system of a first embodiment of the present invention under the condition where an electromagnetic valve is opened.
Figure 2:
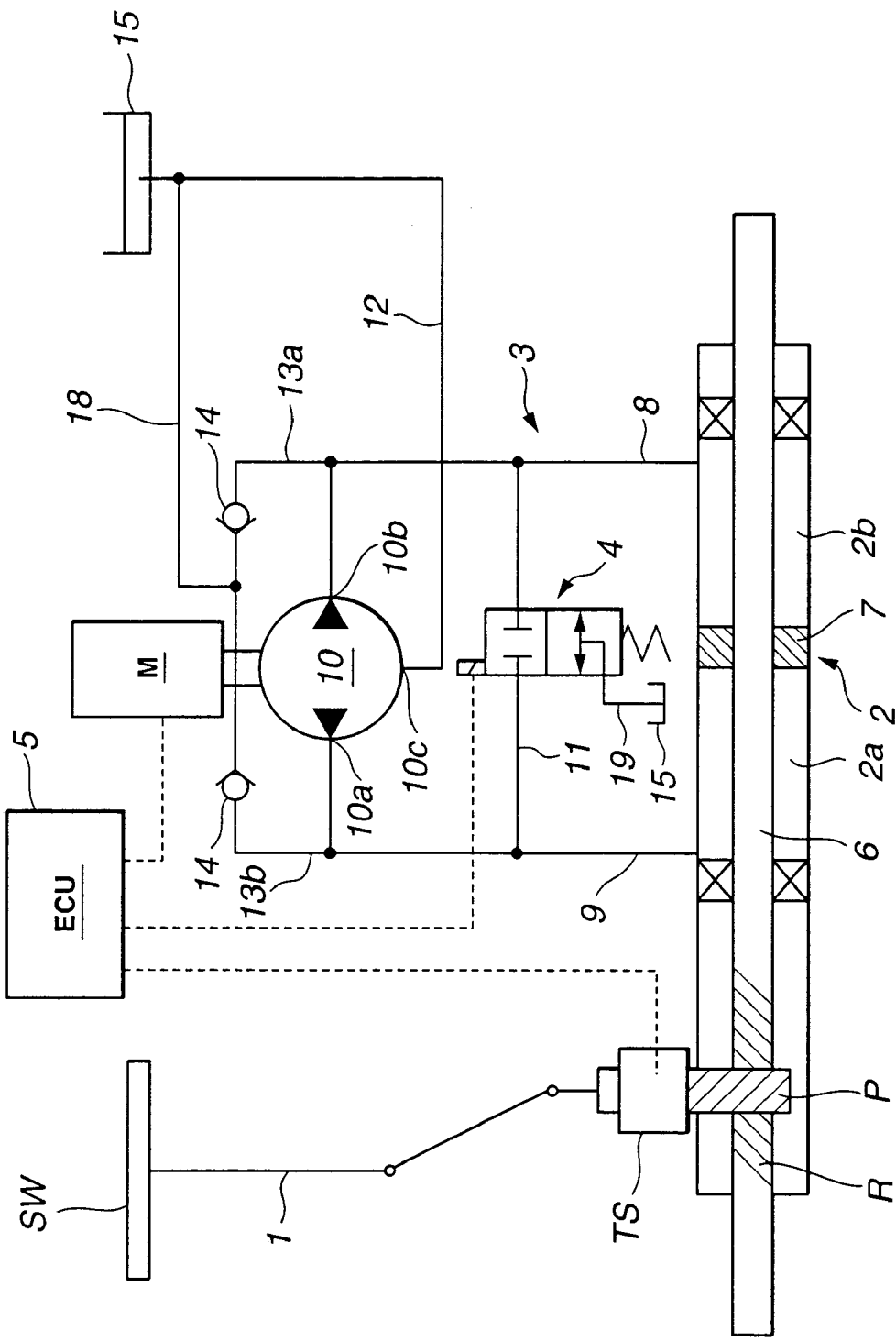
FIG. 2 is a schematic diagram depicting the power steering system of the first embodiment of the present invention under the condition where the electromagnetic valve is closed.

Referring now to FIGS. 1 and 2, there is shown an automotive power steering system of a first embodiment of the present invention. In broad outline, the power steering system is constructed as follows. A steering wheel SW as a steering input means is connected to the upper portion of a steering shaft 1. A rack R and a pinion P as a steering mechanism are provided at an output shaft or the lower portion of steering shaft 1, for transferring a steering torque. A torque sensor TS is provided at the lower end of the output shaft, for detecting the steering torque with which steering wheel SW is turned, and an input from the road via steered front wheels. A power cylinder 2 is operatively associated with rack R, for boosting the steering torque. A hydraulic circuit 3 supplies hydraulic pressure to power cylinder 2. An electric motor M as a drive unit is provided for driving a gear pump 10 as a reversible pump in hydraulic circuit 3. An ECU as a control unit 5 is provided for controlling an electromagnetic valve 4 as a switching valve in hydraulic circuit 3.

In detail, control unit 5 includes a torque-sensor-signal processing circuit, an electric-motor-control calculating circuit, an electric-motor driving circuit, a failure-monitoring circuit, and an electromagnetic-valve driving circuit. Functions of these circuits of control unit 5 are described later.

Power cylinder 2 includes a cylinder portion extending in the is lateral direction of the vehicle, a piston rod 6 operatively associated with rack R and inserted through the cylinder portion, and a piston 7 fixed to piston rod 6 for sliding in the cylinder portion. The internal space of the cylinder portion is divided by piston 7 to define a first hydraulic chamber 2a and a second hydraulic chamber 2b.

Hydraulic circuit 3 consists of a first oil passage 8 connected to hydraulic chamber 2b at one end, a second oil passage 9 connected to hydraulic chamber 2a at one end, gear pump 10 as a reversible pump capable of rotating normally and reversely, connected to the other ends of oil passages 8 and 9, a bypass passage 11 connected to a midpoint of oil passage 8 at one end and to a midpoint of oil passage 9 at the other end, and electromagnetic valve 4 provided at a midpoint of bypass passage 11.

The torque-sensor-signal processing circuit and the electric-motor-control calculating circuit of control unit 5 determine the operation of controlling electric motor M, based on a signal from torque sensor TS. Electric motor M is controlled by the electric-motor driving circuit of control unit 5 accordingly. Gear pump 10 is driven by a normal or a reverse rotation of electric motor M. Incidentally, gear pump 10 and electric motor M are integrally referred to a reversible pump unit. In this structure, each oil pressure supplied to hydraulic chambers 2a and 2b of power cylinder 2 is controlled. The oil pressure difference between hydraulic chambers 2a and 2b presses piston 7 in the lateral direction of the vehicle. Thus, steering support control or boosting steering torque is operated, based on a steered state such as a steering torque and a steering direction by steering wheel SW.

Gear pump 10 includes a pair of oil outlets 10a and 10b, and a leaking passage 10c. The pressurized oil generated by a normal rotation of gear pump 10 is supplied via outlet 10b, and the pressurized oil generated by a reverse rotation of gear pump 10 is supplied via outlet 10a. Outlet 10a is hydraulically connected to one end of oil passage 9, and outlet 10b is hydraulically connected to one end of oil passage 8. Thus, outlets 10a and 10b are hydraulically connected to hydraulic chambers 2a and 2b via oil passages 9 and 8, respectively. On the other hand, leaking passage 10c is hydraulically connected to an oil reservoir 15 via a communicating passage 12. When hydraulic pressure in gear pump 10 is high, the oil leaks from gear pump 10 to oil reservoir 15 via communicating passage 12. This prevents from breaking gear pump 10.

Oil passages 8 and 9 are hydraulically connected to oil reservoir 15 via a communicating passage 18 as a second communicating passage and oil supply passages 13a and 13b, respectively. Check valves 14, 14 are provided in midpoints of oil supply passages 13a and 13b, for allowing one-way flows of hydraulic fluid from oil reservoir 15 to oil passages 8 and 9, respectively. A shortage of oil in hydraulic circuit 3 is supplied from oil reservoir 15 via communicating passage 18 and oil supply passages 13a, 13b.

Electromagnetic valve 4 is provided in bypass passage 11, which is provided between oil passages 8 and 9, in parallel with the passages connected to gear pump 10. Electromagnetic valve 4 is a normally open valve, which is closed by energizing or sending an ON signal or a drive signal generated by the failure-monitoring circuit and the electromagnetic-valve driving circuit of control unit 5, as shown in FIG. 2, or opened by de-energizing or sending an OFF signal, as shown in FIG. 1. In addition, electromagnetic valve 4 is hydraulically connected to oil reservoir 15. Oil reservoir 15 stores at least a lack amount of hydraulic fluid for charging oil passages including oil supply passages 13a and 13b, gear pump 10, oil passages 8 and 9, bypass passage 11, and hydraulic chambers 2a and 2b. The hydraulic fluid stored in oil reservoir 15 is pressurized by an established pressurizing system and is supplied to hydraulic circuit 3 via a communicating passage 19 as a first communicating passage opened by a spool valve of electromagnetic valve 4. Incidentally, the state of opening of communicating passage 19 and the state of opening of bypass passage 11 are associated with each other, as shown in FIGS. 1 and 2.

Figure 3:
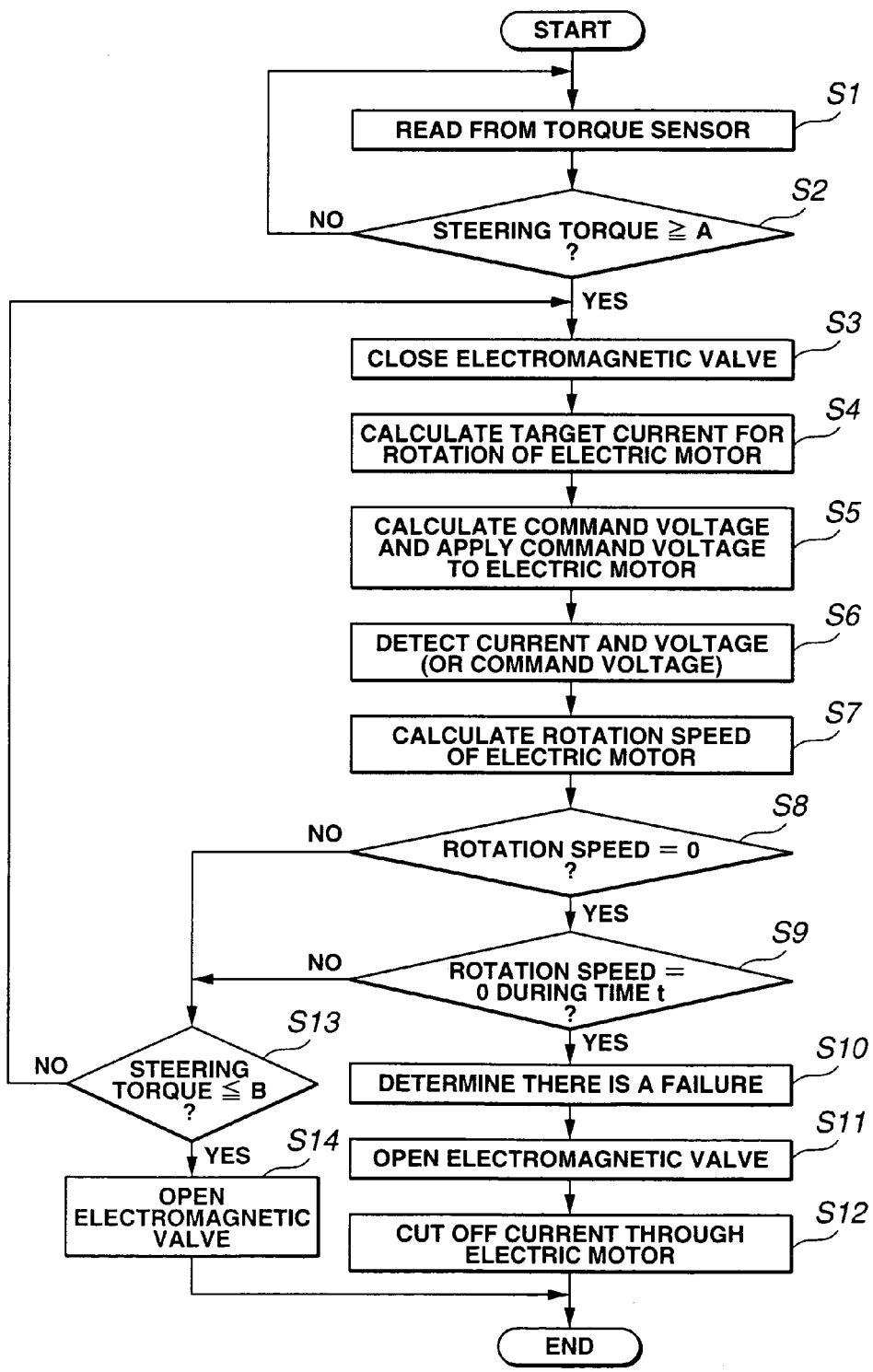
FIG. 3 is a flow chart depicting a control operation of a control unit of the embodiment of the present invention.

Referring now to FIG. 3, there is shown a flow chart of control operation of control unit 5. First, in step S1, an initial steering torque is detected with and read from torque sensor TS. Then, in step S2, whether steering wheel SW is operated or not is determined by comparing the initial steering torque with a predetermined threshold value A. When the steering torque is greater than or equals to threshold value A, it is determined that steering wheel SW is operated. When NO is determined or it is determined that the steering wheel is not operated, the control operation is returned to step S1 and electric motor M is kept inoperative. On the other hand, when YES is determined or it is determined that the steering wheel is operated, steps S3 through S7 are sequentially operated.

In step S3, an ON signal (energizing signal) is output to electromagnetic valve 4 to close bypass passage 11. In step S4, a target electric current for rotation of electric motor is calculated. In step S5, a command voltage is calculated, based on the target current for rotation of electric motor. In step S6, the amount of electric current and the voltage actually applied to electric motor M or the command voltage calculated in step S5 are read. Then, in step S7, the rotation speed of electric motor M is calculated by the following equation.

$$N=(V-L(dI/dt)-IR)/ke$$

where N represents the rotation speed of electric motor M (rpm), V represents the voltage applied to electric motor M (V), L represents the inductance (H), I represents the amount of electric current passing through electric motor M (A), R represents a winding resistance of electric motor M ($\Omega$), and ke represents an electromotive force constant (V/rpm).

Next, in step S8, rotation speed N of electric motor M calculated in step S7 is compared with zero. When rotation speed N of electric motor M equals to zero, it is determined that there is a failure in electric motor M or gear pump 10, and then step S9 is operated. On the other hand, when rotation speed N of electric motor M does not equal to zero, it is determined that there is no failure in the power steering system, and then step S13 is operated. In step S9, it is determined whether rotation speed N of electric motor M continues to be zero during time t, to prevent the misidentification of a failure. When YES is determined or rotation speed N of electric motor M continues to be zero during time t, step S10 is operated. On the other hand, when NO is determined or rotation speed N of electric motor M does not continue to be zero during time t, step S13 is operated.

In step S10, it is determined that there is a failure in the power steering system, based on the determination in step S9. Next, in step S11, as shown in FIG. 1, electromagnetic valve 4 is opened by de-energizing or sending an OFF signal, so that hydraulic chamber 2a and hydraulic chamber 2b of power cylinder 2 are communicated to each other via oil passages 8 and 9, and bypass passage 11. Then, in step S12, electric motor M is de-energized. Thus, a flow of control operation of control unit 5 is terminated.

On the other hand, in step S13, a current steering torque is compared with a predetermined threshold value B, to determine whether the steering torque is falling or not. It is determined whether the steering torque is less than or equals to threshold value B. When NO is determined or the steering torque is greater than threshold value B, it is determined that the steering torque is falling, and then the control operation returns to step S3. On the other hand, when YES is determined or the steering torque is less than or equals to threshold value B, it is determined that the steering torque is not falling, and then step S14 is operated. In step S14, electromagnetic valve 4 is opened by de-energizing or sending an OFF signal, so that hydraulic chamber 2a and hydraulic chamber 2b of power cylinder 2 are communicated to each other via oil passages 8 and 9, and bypass passage 11. Accordingly, preferable steering feel is obtained.

Incidentally, feeding back the reaction force or the restoring force of the steered wheels to the steering wheel is important for preferable steering feel. It is important especially for a small reaction force. In the aforementioned conventional power steering system, the hydraulic fluid drained from the power cylinder is circulating through the gear pump, to raise the oil pressure in each hydraulic chamber. Accordingly, the reaction force of the steered wheel is not properly fed back to the steering wheel, which leads to an unnatural steering feel. However, according to the first embodiment, as described above, when the steering torque is adjacent to the dead zone or the neutral position, electromagnetic valve 4 is opened so that the hydraulic fluid in hydraulic chamber 2a and hydraulic chamber 2b of power cylinder 2 is drained to oil reservoir 15 via oil passages 8 and 9, and bypass passage 11. Accordingly, the reaction force of the steered wheel is properly fed back to the steering wheel, to provide a preferable steering feel.

The following is actual control operations for cases except the case as described above where the steering wheel is operated under the normal condition of the power steering system. When the steering wheel is not operated or the vehicle is traveling straight, step S3 and the following steps are not operated. Accordingly, electric motor M is not operated. Electromagnetic valve 4 kept open, to open bypass passage 11. When the steering wheel is operated and a failure is detected in the power steering system, steps S10 through S12 are operated. In other words, electromagnetic valve 4 is de-energized to be opened, and electric motor M is also de-energized. Thus, hydraulic chambers 2a and 2b of power cylinder 2 are communicated to each other. Accordingly, when there is a failure in the power steering system, degradation of steering feel is prevented, to ensure at least the function and the steering feel of manual steering operation.

Additionally, according to the present invention, there is improvement in the operation of charging the power steering system with hydraulic fluid. When the power steering system is assembled, hydraulic circuit 3 is charged with hydraulic fluid. While the ignition switch is in the off position, the hydraulic fluid stored in oil reservoir 15, which is communicated with electromagnetic valve 4, is supplied to bypass passage 11 via communicating passage 19 by the established pressurizing system. Thus, the hydraulic fluid is diverted in bypass passage 11 and supplied to hydraulic chambers 2a and 2b of power cylinder 2 via oil passages 9 and 8, while the hydraulic fluid is supplied to gear pump 10 via oil passages 8 and 9. Finally, the hydraulic fluid is circulated and returned to electromagnetic valve 4 and partly to oil reservoir 15. In this way, hydraulic circuit 3 is wholly charged with hydraulic fluid. At the time, the air left in hydraulic circuit 3 is pressed to electromagnetic valve 4 by the hydraulic fluid and discharged outside (to oil reservoir 15) via electromagnetic valve 4 at the open state. Evacuation of the air via electromagnetic valve 4 serves for the operation of eliminating the air. In this structure, repeated operations of eliminating the air are not necessary. Accordingly, the operation of charging the hydraulic circuit with hydraulic fluid is easy and efficient, and the cost of the system is lowered.

Figure 4:
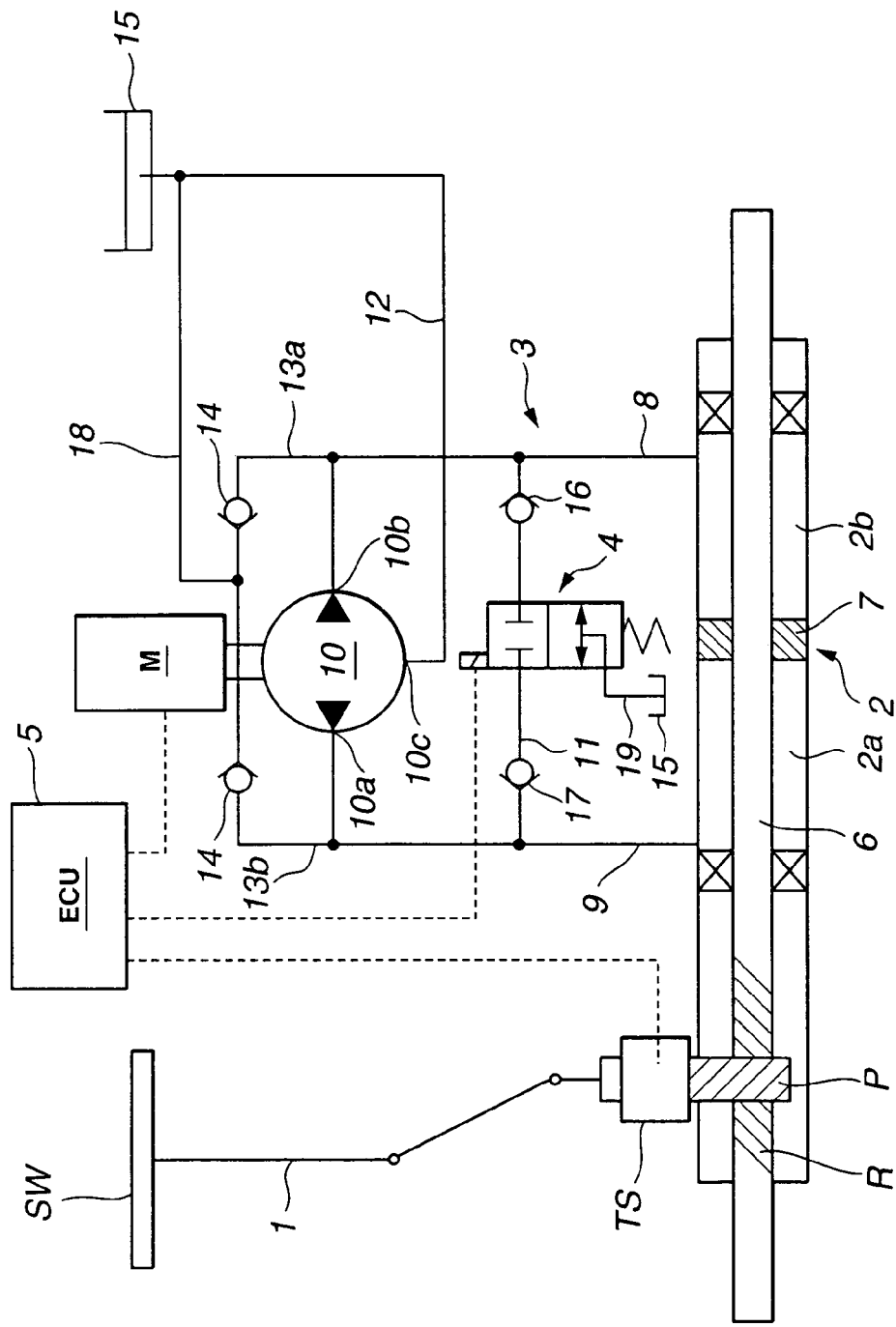
FIG. 4 is a schematic diagram depicting a power steering system of a second embodiment of the present invention under the condition where an electromagnetic valve is closed.

Referring now to FIG. 4, there is shown a second embodiment. The basic structure of the second embodiment is the same as the first embodiment. The power steering system additionally includes check valves 16 and 17 provided at both sides of electromagnetic valve 4 in bypass passage 11, for allowing one-way flows of hydraulic fluid from oil passages 8 and 9 to electromagnetic valve 4 via bypass passage 11. When the power steering system is assembled, hydraulic circuit 3 is charged with hydraulic fluid not via electromagnetic valve 4 but via communicating passage 18 and oil supply passages 13a, 13b hydraulically connected to gear pump 10 by an established pressurizing system.

When the power steering system is assembled, hydraulic circuit 3 is charged with hydraulic fluid by the pressurizing system via check valves 14, 14 and oil supply passages 13a, 13b hydraulically connected to gear pump 10. The hydraulic fluid infused into gear pump 10 is supplied to hydraulic chambers 2a and 2b of power cylinder 2 via oil passages 9 and 8. At the time, the hydraulic fluid flows into bypass passage 11, presses check valves 16 and 17 to open, flows into electromagnetic valve 4 at the open state, and partly returns to oil reservoir 15. In this way, hydraulic circuit 3 is wholly charged with the hydraulic fluid. While the hydraulic fluid is supplied, the air in hydraulic circuit 3 is pressed out from bypass passage 11 via check valves 16 and 17, and normally open electromagnetic valve 4. Consequently, as in the case of the first embodiment, the operation of charging the hydraulic circuit with hydraulic fluid is easy and efficient, and the cost of the system is lowered. In addition, check valves 16 and 17 prevent the hydraulic fluid and the air flowed into bypass passage 11 from reversely flowing. Without reversely flowing, the hydraulic fluid and the air are drained via electromagnetic valve 4, to improve the efficiency of drain.

Under operating conditions of the power steering system, when the direction of rotation of gear pump 10 is changed from a normal rotation to a reverse rotation, the pressure in hydraulic chamber 2a and oil passage 9 is raised, and on the other hand, the pressure in hydraulic chamber 2b is lowered via oil passage 8 by the suction of gear pump 10. At the time, the hydraulic fluid in oil passage 8 presses check valve 16 to open, and returns to oil reservoir 15 via electromagnetic valve 4, which is temporarily opened. In this way, generation of remaining pressure in hydraulic chamber 2b and oil passage 8 is prevented. Consequently, the characteristics of rise of hydraulic pressure difference between hydraulic chambers 2a and 2b is improved, to improve the responsibility of steering assist torque. On the other hand, when the direction of rotation of gear pump 10 is changed from a reverse rotation to a normal rotation, generation of remaining pressure in hydraulic chamber 2a and oil passage 9 is prevented, to provide similar effects.

As described above, when the steering torque rises greater than the predetermined value to operate gear pump 10, electromagnetic valve 4 is energized or receives the ON signal, to cut off the communication of bypass passage 11. Accordingly, oil passage 8 and oil passage 9 are hydraulically separated, and hydraulic chamber 2a and hydraulic chamber 2b are also hydraulically separated. Therefore, hydraulic pressure is favorably supplied selectively to hydraulic chambers 2a and 2b.

Incidentally, the gear pump may be replaced by other reversible pumps. The switching valve is not limited to the electromagnetic valve and may be replaced by other valves. The structure of hydraulic circuit 3 may be properly varied according to the specifications of vehicles.

The entire contents of Japanese Patent Application No. 2003-101045 (filed Apr. 4, 2003) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A power steering system comprising:
a steering shaft operatively associated with a steering mechanism;
a power cylinder that has a pair of hydraulic chambers for boosting a steering torque of the steering mechanism;
a first oil passage hydraulically connected to one of the hydraulic chambers of the power cylinder;
a second oil passage hydraulically connected to another of the hydraulic chambers of the power cylinder;
a reversible pump having an oil outlet hydraulically connected to the first oil passage and another oil outlet hydraulically connected to the second oil passage;
a drive unit that drives the reversible pump;
a control unit that outputs a drive signal to the drive unit, based on a steered state of the steering shaft;
a bypass passage that hydraulically connects the first oil passage to the second oil passage;
a switching valve provided in the bypass passage, for switching between an open state and a closed state of the bypass passage;
an oil reservoir that stores hydraulic fluid;
a first communicating passage that communicates the bypass passage and the oil reservoir via the switching valve to each other;
a first oil supply passage that communicates the oil reservoir and the first oil passage to each other;
a first check valve provided in the first oil supply passage, for allowing one-way supply from the oil reservoir to the first oil passage;
a second oil supply passage that communicates the oil reservoir and the second oil passage to each other; and
a second check valve provided in the second oil supply passage, for allowing one-way supply from the oil reservoir to the second oil passage.

2. The power steering system as claimed in claim 1, wherein the switching valve closes the bypass passage while being energized and opens the bypass passage while being de-energized.

3. A power steering system comprising:
a steering mechanism having an input portion adapted to steering operation and an output portion adapted to be operatively associated with a wheel, for transferring a steering torque from the input portion to the output portion;
a power cylinder operatively associated with the steering mechanism and having a first hydraulic chamber and a second hydraulic chamber, for boosting the steering torque according to a hydraulic pressure difference between the first hydraulic chamber and the second hydraulic chamber;
a reversible pump unit having a first oil outlet and a second oil outlet, for supplying pressurized hydraulic fluid via either of the first oil outlet and the second oil outlet;
a first oil passage having one end hydraulically connected to the first hydraulic chamber of the power cylinder and one end hydraulically connected to the first oil outlet of the reversible pump unit;
a second oil passage having one end hydraulically connected to the second hydraulic chamber of the power cylinder and one end hydraulically connected to the second oil outlet of the reversible pump unit;
a bypass passage having one end hydraulically connected to the first oil passage and one end hydraulically connected to the second oil passage;
a switching valve provided at a midpoint of the bypass passage, for switching between an open state and a closed state of the bypass passage;
an oil reservoir hydraulically connected to the bypass passage via the switching valve;
a control unit, for controlling an operation of the reversible pump unit and an operation of the switching valve;
a first oil supply passage hydraulically connected to the first oil passage at one end and to the oil reservoir at one end;

a first check valve provided at a midpoint of the first oil supply passage, for allowing one-way flow from the oil reservoir to the first oil passage;

a second oil supply passage hydraulically connected to the second oil passage at one end and to the oil reservoir at one end; and a second check valve provided at a midpoint of the second oil supply passage, for allowing one-way flow from the oil reservoir to the second oil passage.

4. The power steering system as claimed in claim 3, wherein the switching valve closes the bypass passage while being energized and opens the bypass passage while being de-energized.

5. The power steering system as claimed in claim 3, wherein the reversible pump unit is hydraulically connected to the oil reservoir.

6. The power steering system as claimed in claim 5, wherein the switching valve closes the bypass passage while being energized and opens the bypass passage while being de-energized.

7. A method of charging a power steering system with hydraulic fluid, the power steering system comprising:

a steering shaft operatively associated with a steering mechanism;

a power cylinder having a pair of hydraulic chambers for boosting a steering torque of the steering mechanism;

a first oil passage hydraulically connected to one of the hydraulic chambers of the power cylinder;

a second oil passage hydraulically connected to another of the hydraulic chambers of the power cylinder;

a reversible pump having an oil outlet hydraulically connected to the first oil passage and another oil outlet hydraulically connected to the second oil passage;

a drive unit that drives the reversible pump;

a control unit that outputs a drive signal to the drive unit, based on a steered state of the steering shaft;

a bypass passage that hydraulically connects the first oil passage to the second oil passage;

a switching valve provided in the bypass passage, for switching between an open state and a closed state of the bypass passage, an oil reservoir that stores hydraulic fluid, a first communicating passage that communicates the switching valve and the oil reservoir to each other;

a first oil supply passage that communicates the oil reservoir and the first oil passage to each other;

a first check valve provided in the first oil supply passage, for allowing one-way supply from the oil reservoir to the first oil passage;

a second oil supply passage that communicates the oil reservoir and the second oil passage to each other; and a second check valve provided in the second oil supply passage, for allowing one-way supply from the oil reservoir to the second oil passage, the method comprising:

a first operation of opening the switching valve;

a second operation of evacuating air in the power steering system via the first communicating passage; and a third operation of charging the power steering system with hydraulic fluid via the first communicating passage.

8. The method of charging a power steering system with hydraulic fluid as claimed in claim 7, wherein the switching valve closes the bypass passage while being energized and opens the bypass passage while being de-energized; and wherein the first operation opens the switching valve by de-energizing the switching valve.

* * * * *